: (12) United States Patent
Spahn

(10) Patent No.: US 7,277,568 B2
(45) Date of Patent: Oct. 2, 2007

(54) METHOD FOR SUPPRESSING GHOST IMAGE ARTIFACTS IN X-RAY DEVICE FOR PERFORMING THIS METHOD

(75) Inventor: Martin Spahn, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 876 days.

(21) Appl. No.: 10/395,498

(22) Filed: Mar. 24, 2003

(65) Prior Publication Data

US 2003/0210762 A1  Nov. 13, 2003

(30) Foreign Application Priority Data

Mar. 26, 2002  (DE) .............................. 102 13 564

(51) Int. Cl.
*G06K 9/00* (2006.01)
*G01T 1/24* (2006.01)
*H01L 25/00* (2006.01)
*H01L 27/00* (2006.01)
*H01L 27/146* (2006.01)

(52) U.S. Cl. .................. 382/132; 250/370.09
(58) Field of Classification Search ................. 382/132
See application file for complete search history.

(56) References Cited

U.S. PATENT DOCUMENTS

| | | | | |
|---|---|---|---|---|
| 4,335,427 A | * | 6/1982 | Hunt et al. .................. | 600/407 |
| 4,430,749 A | * | 2/1984 | Schardt ....................... | 382/130 |
| 4,514,759 A | * | 4/1985 | Amtmann .................. | 378/98.12 |
| 4,663,773 A | * | 5/1987 | Haendle et al. ........... | 378/98.12 |
| 5,081,179 A |   | 1/1992 | Sezaki et al. | |
| 5,331,682 A |   | 7/1994 | Hsieh | |
| 5,617,461 A | * | 4/1997 | Schreiner .................... | 378/98.5 |
| 5,886,353 A | * | 3/1999 | Spivey et al. ........... | 250/370.09 |
| 6,028,314 A | * | 2/2000 | Finkler ................... | 250/370.11 |

(Continued)

FOREIGN PATENT DOCUMENTS

EP  0 578 311 A2  7/1993

(Continued)

OTHER PUBLICATIONS

Bildgebende Systeme für die medizinische Dagnostik, Seiten 341-350, Morneburg, Publicis MCD Verlag = Imaging Systems for Medical Diagnostics, 1990, Krestel, Seite 361-369.

*Primary Examiner*—Andrew W. Johns
*Assistant Examiner*—Damon Conover
(74) *Attorney, Agent, or Firm*—Brinks Hofer Gilson & Lione

(57) ABSTRACT

A method for suppressing ghost image artifacts in x-ray images is provided. In chronological order, a plurality of x-ray images of one or more objects is generated with the interposition of at least one solid-state detector for generating a visible image by incident x-radiation. From each currently generated x-ray image, a previously ascertained correction image is electronically subtracted. The last correction image ascertained is generated by a blank image, and before its use, it is examined for the presence of residual-image effects. If a predetermined limit value of a proportion of residual-image effects (proportion of residual images) is exceeded, the last correction image is discarded at least partially, and an earlier correction image ascertained by a blank image with a lesser proportion of residual images is used at least partially for correcting the current x-ray image.

16 Claims, 2 Drawing Sheets

U.S. PATENT DOCUMENTS

Figure 1:
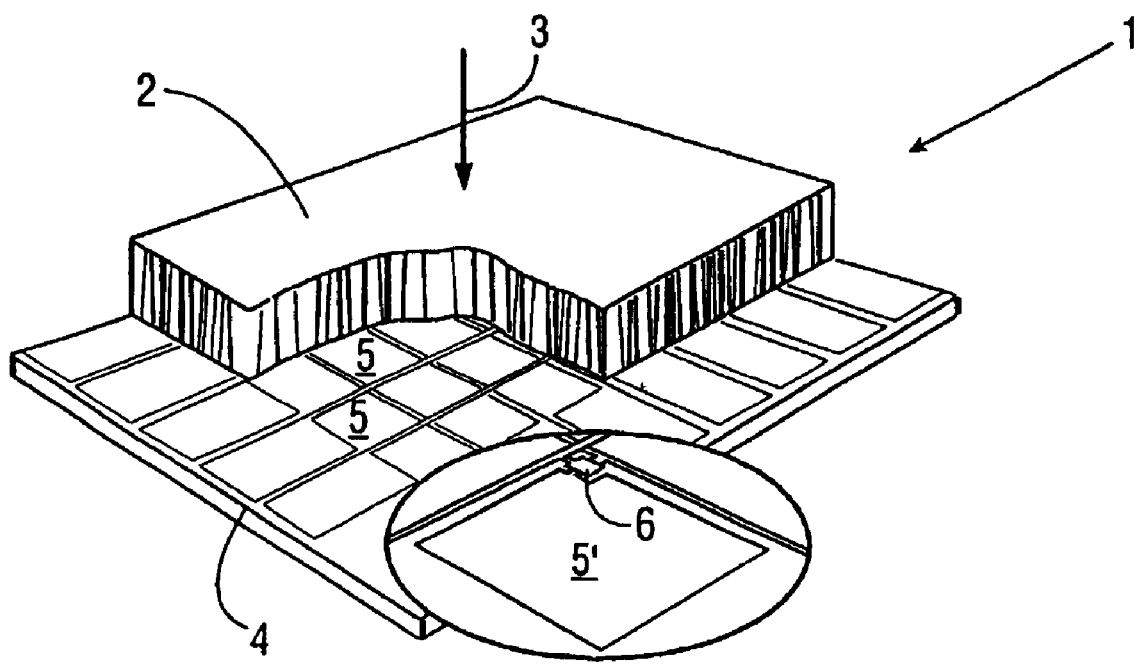

| | | |
|---|---|---|
| 6,448,544 B1 * | 9/2002 | Stanton et al. ............ 250/208.1 |
| 6,747,697 B1 * | 6/2004 | Lin et al. ..................... 348/246 |
| 7,031,503 B2 * | 4/2006 | Ozaki et al. ................. 382/130 |
| 2002/0167597 A1 * | 11/2002 | Nakano et al. ........... 348/223.1 |
| 2003/0226973 A1 * | 12/2003 | Beusch .................. 250/370.09 |

FOREIGN PATENT DOCUMENTS

| EP | 0 642 264 B1 | 8/1994 |
|---|---|---|

* cited by examiner

METHOD FOR SUPPRESSING GHOST IMAGE ARTIFACTS IN X-RAY DEVICE FOR PERFORMING THIS METHOD

REFERENCE TO RELATED APPLICATIONS

The present patent document claims priority to German Application Serial No. DE 10213564.9, filed Mar. 26, 2002, which is hereby incorporated by reference.

BACKGROUND

The invention relates to a method for suppressing ghost image artifacts in x-ray images, in which in chronological order, a plurality of x-ray images of one or more objects is generated with the interposition of at least one solid-state detector for generating a visible image by incident x-radiation, and from each currently generated x-ray image, a previously ascertained correction image (offset image) is electronically subtracted.

The invention also relates to an x-ray device for generating x-ray images with at least one x-ray source, one solid-state detector, and one image processing device for correcting the x-ray image taken in accordance with the above method.

Imaging x-ray devices, particularly for medical diagnosis, are widely known. In such x-ray devices, originally and in part even today, the images generated are taken directly by x-radiation on radiation-sensitive films. Over the course of development, to improve the imaging power, the films have been replaced by so-called solid-state detectors, which make digital imaging possible. These solid-state detectors are, for instance, a cesium iodide scintillator in which the x-ray quanta striking it generate light pulses, which in turn are converted by a suitably disposed photodiode matrix into electrical charge and are read out electronically. Such solid-state detectors, which can also be called direct x-ray converters, have the disadvantage that because of the property of the solid-state detector, so-called "memory" effects occur, which are due, for instance, to incomplete charge accumulation or low induced energy levels in the detector material that do not empty until later under thermal induction. As a consequence, residual signals from a previous image remain in the detector and are superimposed on an image generated later. These effects are intrinsically greater the shorter the chronological spacing between two successive images generated, or the higher the applied x-ray dose with which an image was generated.

Besides these residual-image effects, which do not occur until images are taken, solid-state detectors also have properties that vary from one pixel to another, such as dark flows, leak flows, or pixel capacitances. Also, each readout channel has various properties because of various line capacitances, input capacitances of the input amplifier, and the like. To generate an image with low noise, these last-named effects are eliminated; this is done by eliminating a correction image, which contains solely the background effects but not any image information, from an object image.

To improve the image quality of a digital x-ray image taken, it is known for instance from European Patent EP 0 642 264 B1 for a previously ascertained correction image to be subtracted electronically from an x-ray image taken, and in this way to reduce possible artifacts that arise from the specific properties of the detector matrix or from residual charges on the detector matrix.

It is intrinsically favorable on the one hand, in defining a correction image that is to be subtracted from a current image, to allow the longest possible time to elapse between a previous image and the taking of the correction image—which is done without an object—to keep the "memory" effect slight. On the other hand, however, the correction image should be as current as possible, so that changes in the detector matrix will as much as possible match the status at the instant when the image is actually taken.

Thus if a correction image, which because of the "memory" effects still contains some of an earlier image, is used to correct a new image, then a so-called "ghost image" that originates in the residues of the earlier image is generated on the corrected new image. On the other hand, a correction image that is too old, although it does not contain any "ghost image" information, is nevertheless too far away chronologically from the image to be corrected and has excessive statistical noise. This is because the correction values obtained there, because of their variation over time, no longer match the currently present correction values.

SUMMARY

It is therefore the object of the invention to disclose a method which reduces the presence of ghost image artifacts yet at the same time keeps the background noise in an image as slight as possible. By suitable processing and statistical assessment of a correction image taken before a current x-ray image, how large the proportion of residual images in the correction image is determined. Once this value is known, a decision can be made as to whether it is more favorable, for correcting the current image, to use an older correction image with a smaller proportion of residual images, or the most recent current correction image.

In accordance with this concept, improvements to methods for suppressing ghost image artifacts in x-ray images, in which in chronological order, a plurality of x-ray images of one or more objects is generated with the interposition of at least one solid-state detector for generating a visible image by incident x-radiation, and from each currently generated x-ray image, a previously ascertained correction image (offset image) is electronically subtracted, are used such that the last correction image ascertained is generated as a blank image, and, before its use, the last correction image is examined for the presence of residual-image effects, and if a predetermined limit value of a proportion of residual-image effects (proportion of residual images) is exceeded, the last correction image is discarded at least proportionally, and an earlier correction image, acquired as a blank image, with a lesser proportion of residual images is used at least partially for correcting the current x-ray image.

The last correction image can accordingly be discarded entirely and entirely replaced by an earlier correction image. On the other hand, the last correction image can also change over only proportionally into a new correction image, by the formation of slidingly weighted mean values of the pixels from an old correction image and from the last correction image, and thus a new correction image can be generated which is then used for the correction.

To determine the residual-image proportion in the current correction image, an earlier correction image without a proportion of residual images can in turn be subtracted from the current correction image, so that from the resultant image, the proportion of residual images can easily be detected.

Also, for determining the proportion of residual images, the current correction image can be processed in terms of imaging like a normal x-ray image.

One possibility for determining the proportion of residual images in the correction image is to perform a statistical evaluation of the pixel values of the correction image; for instance, the value of an ascertained signal and/or the standard deviation of the pixel values of the correction image can be used as a standard for the magnitude of the proportion of residual images.

Since a complete statistical evaluation over the full surface of a digitized x-ray image requires major computation effort, it is also possible, in order to reduce the computation effort, first to combine partial areas of the correction image and then to assess each combined region as a pixel of a new image to be processed. This technique for reducing the computation effort is known by the professional term "binning".

Another possibility for reducing the computation effort is to observe only one partial area of the correction image for the statistical evaluation; the observed partial area is either selected rows and/or columns of an image matrix, or else only certain selected zones of an image matrix are observed. Moreover, a statistical random selection from among the pixels can be used for performing the statistical observation of the total image.

It can also be advantageous, before the statistical evaluation, to subject the correction image to low-pass filtering with a variable kernel size; by low-pass filtering with a small kernel, the statistical noise is eliminated, and by the low-pass filtering with a larger kernel, slight fluctuations around zero, for instance from temperature or electrical offset fluctuations, are eliminated.

For assessing whether an excessively high residual-image proportion is contained in the correction image, the fact can also be used whether a minimum number of pixels in the correction image are located outside a predetermined fluctuation range.

A further improvement in the method can be attained by providing that the predetermined limit value, beyond which the decision that the proportion of residual images is too high is made, is subject to a chronological adaptation; with this, the contradictory demands in terms of the time interval between the correction image and the actual x-ray image can be taken into account.

In accordance with the above-described method and concept, the x-ray device known per se for generating x-ray images with at least one x-ray source, one solid-state detector, and one image processing device for correcting the x-ray image taken, is improved by providing that the image processing device has at least one processor with memory and software for performing the above-described method.

Additional characteristics and advantages of the invention will become apparent from the ensuing description of a preferred exemplary embodiment in conjunction with the drawings.

DETAILED DESCRIPTION OF THE DRAWINGS

Figure 2:
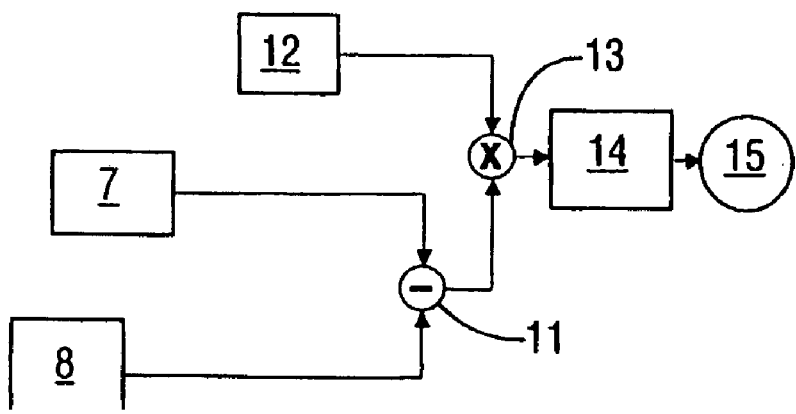
Figure 3:
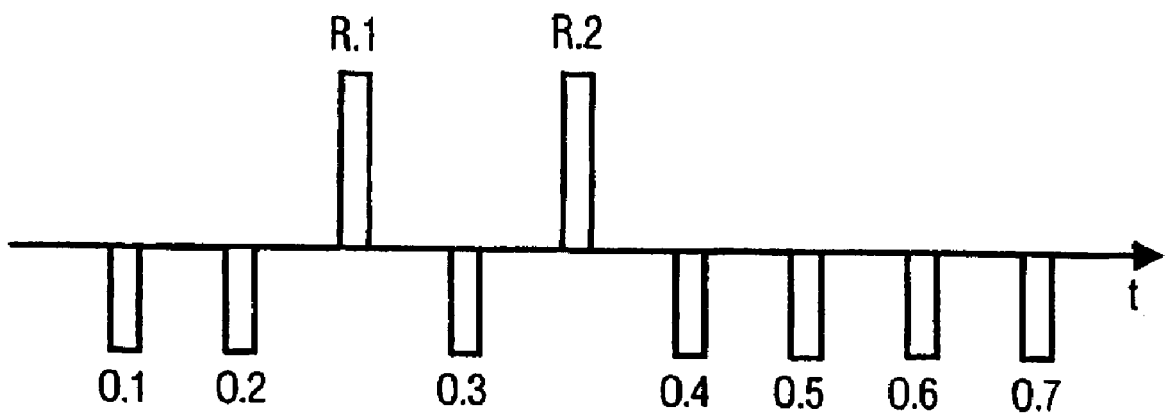
Figure 4:
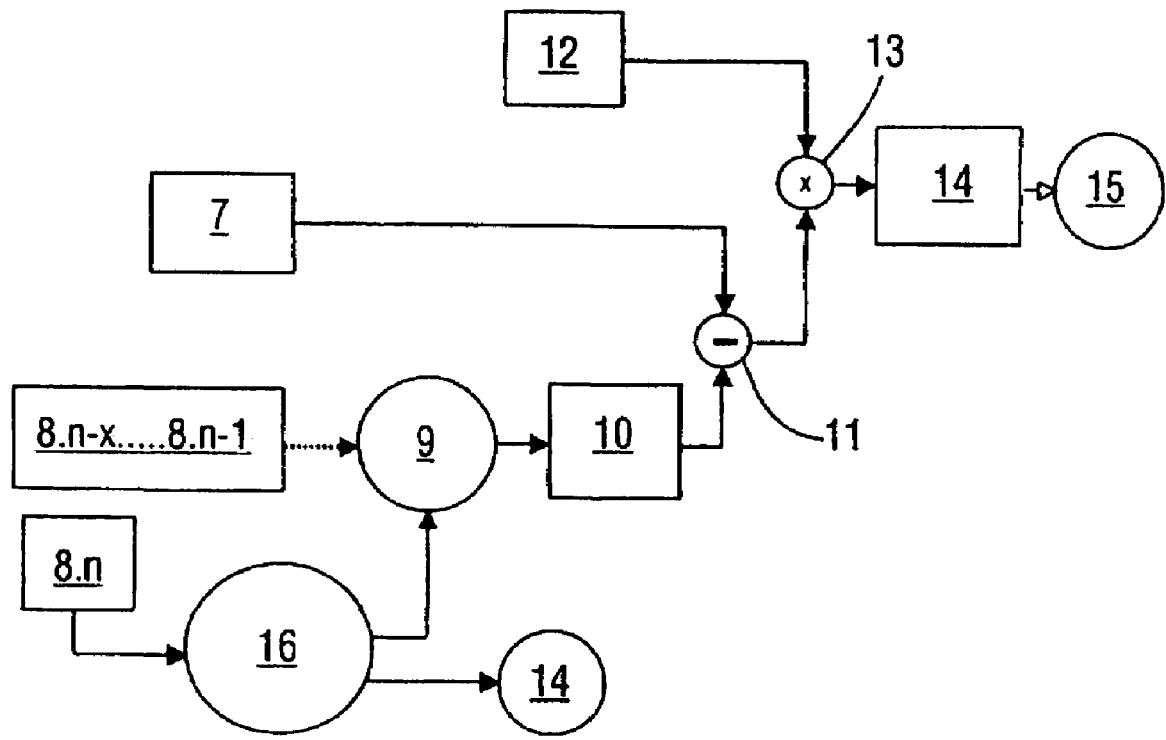

The invention will be described below in further detail in conjunction with the drawings. Shown are:

FIG. 1: a schematic fragmentary view of a solid-state detector;

FIG. 2: a previous method for correcting x-ray images;

FIG. 3: an example of a chronological course of x-ray images;

FIG. 4: a schematic illustration of the correction method of the invention.

DETAILED DESCRIPTION OF THE PREFERRED EMBODIMENTS

In FIG. 1, a fragment of a solid-state detector 1 is shown. The solid-state detector 1 substantially is a scintillator layer 2, such as cesium iodide, which is applied to a readout matrix 4. The readout matrix 4 has many pixels 5 arranged in chessboard fashion, each containing one photodiode 5', which detects light signals that are generated by the penetration of x-rays 3 into the scintillator layer 2. Each pixel 5 also includes, besides the photodiode 5' in which the light is converted into an electrical signal, a switch 6 with the aid of which the electrical signal is read out. In this way, by readout of the many pixels 5 arranged in chessboard fashion, an electronic image is generated with a matrix of image information, and this information can be processed in a further process.

Referring to FIG. 2, because of the specific properties of the solid-state detector, if an optimal x-ray image is to be achieved, the old image information is post processed. For this post processing, a blank correction image 8 is taken in phases where no x-ray image of an object is being made, or in other words without the presence of x-radiation. This correction image is subtracted with the aid of a subtraction method from the next x-ray image 7 and then subjected to gain correction 13 by a gain image 12, whereupon it is available in the form of an offset- and gain-corrected x-ray image 14 for further image processing at 15. Other corrections, such as the correction of defective pixels, can follow.

One example of a chronological sequence of such images is shown in FIG. 3.

This drawing shows a time axis t. Below the time axis t, the course of the correction image generation of correction images 01-07 is shown, while above the time axis t, the course of the generated x-ray images R1-R2 is shown.

Between the two images of the x-ray images R1 and R2, a correction image 03 was taken, which because of the x-ray image R1 taken shortly before it still contains residual-image portions of the x-ray image R1. If this correction image 03 is now used to correct the x-ray image R2 taken after it, then the proportion of residual images still contained in the correction image 03 generate unwanted shadows (ghost images) that still derive from the x-ray image R1. If to correct the x-ray image R2 one were to use the previously taken correction image 02, which contains either no or only very slight proportions of residual images, the result may be a substantially better x-ray image from the x-ray image R2. The generation of a ghost image may then be largely avoided, and on the other hand, the interval between when correction image 02 and the x-ray image R2 are taken would be so slight that the correction image is readily relevant as a correction image given the properties of the current detector.

This concept according to the invention is illustrated once again in FIG. 4, which shows the schematic course of an image correction according to the invention.

FIG. 4 also shows the fundamental method of correcting an x-ray image 7 by a correction image 10, with the aid of the subtraction method and an ensuing gain correction 13 by the gain image 12. The image 14 obtained is then transferred to the further image processor 15. Instead of using the most recently taken correction image 8.n without checking, this image first passes through a checking process 16, in which the proportion of residual images is detected if present, and a decision 9 is made whether it is more favorable to use this most recent correction image 8.n, or a correction image 8.n–x taken before it.

Another consequence of the comparison of the old and new proportion of residual images can also be that a compromise can be made between discarding a correction image that has been taken and using that correction image completely, because by forming slidingly weighted mean values—between the pixels of a previously measured or calculated correction image—a new correction image is generated. Now by a suitable selection of weighting factors, both the magnitude of the proportion of residual images of the currently taken correction image and the age of an earlier correction image can be taken into account; the weighting factors take less account of an older image and more account of a later image, on the one hand, and on the other, they value an image with a higher proportion of residual images at a reduced value compared to an image with a lesser proportion of residual images.

The detection of the proportion of residual images has been described in detail above and is based essentially on the fact that the residual-image proportions of a image do not exhibit normal statistical variation, while the remaining correction values of a correction image from a solid-state detector, because of the statistical variations of the properties themselves, are not subject to regularity, but instead exhibit good random behavior.

In a simple embodiment of the invention, according to the method shown in FIG. 4, if the proportion of residual images of the current correction image is too high, the correction image taken before it can be used again. However, the possibility also exists of making an optimal compromise, from a collection of correction images taken in the past, between the age of the correction image and the proportions of residual images and making a suitable selection for the correction image to be used.

It is understood that the characteristics of the invention recited above can be used not only in the particular combination stated but also in other combinations or each on their own, without departing from the scope of the invention.

The invention claimed is:

1. A method for suppressing ghost image artifacts in x-ray images, in which a plurality of x-ray image of one or more objects is generated with the interposition of at least one solid-state detector for generating a visible image by incident x-radiation, and from each currently generated x-ray image, a previously ascertained correction image is electronically subtracted, characterized in that:
   a last correction image is generated as a blank image, and before use of the last correction image, the last correction image is examined for the presence of residual-image effects, and
   if a predetermined limit value of a proportion of residual-image effects is exceeded, the last correction image is discarded at least partially, and an earlier correction image of a blank image with a lesser proportion of residual images is used at least partially for correcting the current x-ray image.

2. The method of foregoing claim 1, characterized in that the last correction image is discarded completely and replaced by the earlier correction image.

3. The method of foregoing claim 1, characterized in that the last correction image is changed to a new correction image as a function of slidingly weighted mean values of the pixels from an old correction image and the last correction image, and the new correction image is used for correction.

4. The method of foregoing claim 1, characterized in that to determine the proportion of residual-image effects in the current correction image, an earlier correction image without a proportion of residual-image effects is subtracted from the current correction image.

5. The method of foregoing claim 1, characterized in that for determining the proportion of residual-image effects, the current correction image is processed in terms of imaging like a normal x-ray image.

6. The method of foregoing claims 1, characterized in that for determining the proportion of residual-image effects in the correction image, a statistical evaluation of the pixel values of the correction image is performed.

7. The method of foregoing claim 6, characterized in that the value of an ascertained signal and/or the standard deviation of the pixel values of the correction image is used as a standard for the magnitude of the proportion of residual images.

8. The method of foregoing claim 6, characterized in that for the statistical evaluation, first partial areas of the correction image are combined and then each combined region is evaluated as a pixel.

9. The method of foregoing claim 6, characterized in that the statistical evaluation is for only one partial area of the correction image.

10. The method of foregoing claim 9, characterized in that the one partial area of the correction image is selected rows and/or columns of an image matrix.

11. The method of foregoing claim 9, characterized in that the one partial area of the correction image is selected zones of an image matrix.

12. The method of foregoing claim 9, characterized in that the one partial area of the correction image is a statistical random selection of pixels of an image matrix.

13. The method of foregoing claim 1, characterized in that the correction image is subjected to low-pass filtering before statistical evaluation.

14. The method of foregoing claim 1, characterized in that for the current correction image to be discarded, a minimum number of pixels in the current correction image are located outside a predetermined fluctuation range.

15. The method of foregoing claim 1, characterized in that the predetermined limit value is subject to a chronological adaptation.

16. In an x-ray device for generating a current x-ray image with at least an x-ray source, a solid-state detector, and an image processing device for correcting the x-ray image, the improvement comprising:
   the image processing device operable to examine a last correction image generated as a blank image before use of the last correction image, the last correction image examined for the presence of residual-image effects, and operable to, if a predetermined limit value of a proportion of residual-image effects is exceeded, discard the last correction image at least partially and use an earlier correction image with a lesser proportion of residual images at least partially for correcting the current x-ray image.

* * * * *